(12) United States Patent
Getlichermann et al.

(10) Patent No.: US 10,130,973 B2
(45) Date of Patent: *Nov. 20, 2018

(54) PROCESS FOR MANUFACTURING A WATERPROOFING MEMBRANE

(71) Applicant: S.A. Imperbel N.V., Lot (BE)

(72) Inventors: Michel Getlichermann, Perwez (BE); Xavier Godeaux, Perwez (BE); Hans Aerts, Lot (BE); Eric Bertrand, Perwez (BE)

(73) Assignee: S.A. Imperbel N.V., Lot (BE)

( * ) Notice: Subject to any disclaimer, the term of this patent is extended or adjusted under 35 U.S.C. 154(b) by 6 days.

This patent is subject to a terminal disclaimer.

(21) Appl. No.: 15/210,757

(22) Filed: Jul. 14, 2016

(65) Prior Publication Data

US 2017/0009455 A1    Jan. 12, 2017

Related U.S. Application Data

(63) Continuation of application No. 13/886,338, filed on May 3, 2013, now Pat. No. 9,486,831.

(30) Foreign Application Priority Data

May 3, 2012 (EP) ..................................... 12166698

(51) Int. Cl.
    *B05D 1/38*      (2006.01)
    *E04D 5/10*      (2006.01)
    (Continued)

(52) U.S. Cl.
    CPC ............... *B05D 1/38* (2013.01); *B05D 3/007* (2013.01); *B05D 5/00* (2013.01); *C08K 3/22* (2013.01);
    (Continued)

(58) Field of Classification Search
None
See application file for complete search history.

(56) References Cited

U.S. PATENT DOCUMENTS

| | | |
|---|---|---|
| 3,565,595 A | 2/1971 | Gaskell et al. |
| 4,853,198 A | 8/1989 | Orli et al. |
| (Continued) | | |

FOREIGN PATENT DOCUMENTS

| | | |
|---|---|---|
| WO | 97/24485 A1 | 7/1997 |
| WO | 2004/070107 A2 | 8/2004 |
| WO | 2012/073224 A1 | 6/2012 |

OTHER PUBLICATIONS

Withers, J., "Material Safety Data Sheet, Product: #1300," Specification Chemicals, Inc., Jan. 1, 1998, <http://www.menards.com/msds/1011696_001.pdf>, 4 pages.

(Continued)

*Primary Examiner* — Michael P. Rodriguez
(74) *Attorney, Agent, or Firm* — Christensen O'Connor Johnson Kindness PLLC

(57) ABSTRACT

The present invention relates to a process for manufacturing a waterproofing membrane comprising:
    a preparation of a composition dispersed in a solvent;
    coating a reinforcement layer by application of said composition on one side of the reinforcement layer;
    an evaporation of said solvent;
    having the coated reinforcement layer dried; and
    an application of a bituminous mass on another side of said reinforcement layer,
    characterized in that, during the preparation of the composition, the composition is dispersed in a solvent chosen in the group consisting of a solvent other than water or water.

(Continued)

The present invention relates also to a composition for a waterproofing membrane.

7 Claims, 7 Drawing Sheets

(51) Int. Cl.
| | | |
|---|---|---|
| *D06N 5/00* | (2006.01) | |
| *B05D 5/00* | (2006.01) | |
| *E04D 5/02* | (2006.01) | |
| *B05D 3/00* | (2006.01) | |
| *C08K 3/22* | (2006.01) | |
| *C08K 3/26* | (2006.01) | |
| *C08K 3/34* | (2006.01) | |
| *C08K 3/36* | (2006.01) | |
| *C08K 9/02* | (2006.01) | |
| *C09D 133/02* | (2006.01) | |
| *E04D 5/00* | (2006.01) | |

(52) U.S. Cl.
CPC ............... *C08K 3/26* (2013.01); *C08K 3/346* (2013.01); *C08K 3/36* (2013.01); *C08K 9/02* (2013.01); *C09D 133/02* (2013.01); *D06N 5/003* (2013.01); *E04D 5/00* (2013.01); *E04D 5/02* (2013.01); *E04D 5/10* (2013.01); *C08K 2003/2241* (2013.01); *C08K 2003/265* (2013.01); *D06N 2203/041* (2013.01); *D06N 2205/10* (2013.01); *D06N 2209/0823* (2013.01); *D06N 2209/0876* (2013.01); *D06N 2209/1692* (2013.01)

(56) References Cited

U.S. PATENT DOCUMENTS

| | | |
|---|---|---|
| 5,907,003 A | 5/1999 | Blot et al. |
| 2004/0202601 A1 | 10/2004 | Wen et al. |
| 2006/0110996 A1 | 5/2006 | Getlichermann et al. |
| 2006/0280892 A1 | 12/2006 | Davis et al. |
| 2008/0308214 A1 | 12/2008 | Gervat et al. |
| 2010/0130080 A1 | 5/2010 | Coninx et al. |

OTHER PUBLICATIONS

Withers, J., "Material Safety Data Sheet, Product: #1300," Specification Chemicals, Inc., Jul. 14, 2004, <http://spec-chem.com/assets/1300-White-Plastic.pdf>, 3 pages.

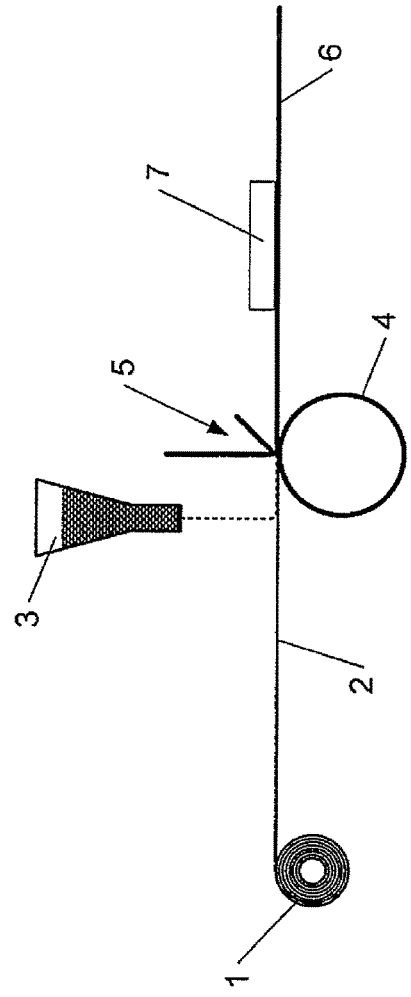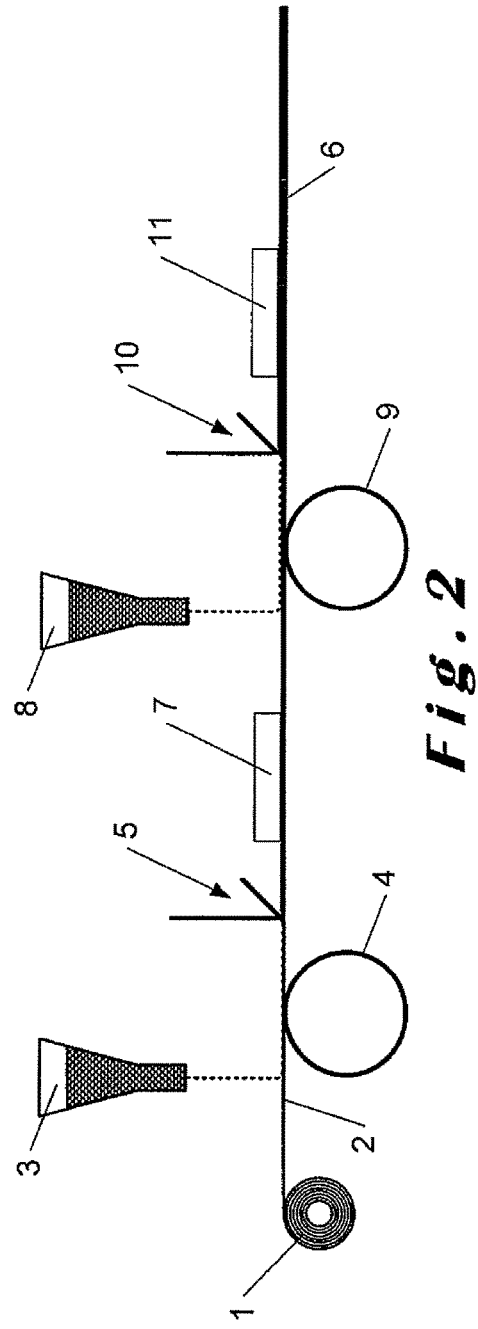

PROCESS FOR MANUFACTURING A WATERPROOFING MEMBRANE

CROSS-REFERENCE TO RELATED APPLICATIONS

This application is a continuation of U.S. application Ser. No. 13/886,338, filed May 3, 2013, which claims priority to European Application No. 12166698.6, filed May 3, 2012, each of which is expressly incorporated herein by reference in its entirety.

BACKGROUND

The present invention relates to a process for manufacturing a waterproofing membrane comprising:

a preparation of a composition comprising an acrylic polymer and titanium dioxide dispersed in a solvent;

coating a reinforcement layer by application of said composition on one side of the reinforcement layer;

having the coated reinforcement layer dried; and an application of a bituminous mass on another side of said reinforcement layer.

The present invention relates also to a composition for a waterproofing membrane.

A process for manufacturing such a waterproofing membrane is known from US2006/0110996. The coated waterproofing membrane, obtained by the known process, has the property to reflect the solar rays due to the presence of titanium dioxide and allows to avoid exudation problems of the membrane due to the presence of a coating with an acrylic polymer as binder which is less sensitive to solar rays. So the coating forms as if to say a barrier against the solar rays so that the latter heat less the bituminous mass and the building on which the membrane is placed as a roof covering.

A drawback of the known membrane is that its reflectivity decreases over time. Indeed, the colour of the coating on the membrane changes from white to yellow so that the coating on such a membrane loses its reflectivity property over the years. Consequently, in the known waterproofing membrane, the oil contained in the bituminous mass may migrate more easily to the upper side of the waterproofing membrane because the membrane heats more up due to the reflectivity decrease. This oil migration phenomenon is called exudation and it further reduces the long-term whiteness of the waterproofing membrane. Also, pollution could be provoked if the oil will not remain in the crystalline phase of the bituminous mass and mix with rain water.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It is an object of the invention to provide a process for manufacturing a waterproofing membrane where the reflectivity decrease is reduced, thereby providing a long-term whiteness of said membrane.

A process for manufacturing a waterproofing membrane according to the invention is characterized in that, during the preparation of the composition, the acrylic polymer and the titanium dioxide are dispersed in a solvent chosen in the group consisting of a solvent other than water or water wherein the acrylic polymer, the titanium dioxide and additives, in particular a thickening agent, are mixed with cristobalite.

The invention thus provides two alternatives to solve the mentioned problem.

In the first alternative, the process is characterised in that the acrylic polymer and the titanium dioxide are dispersed in a solvent other than water before application of the composition.

It was established through researches that the viscosity of a composition comprising an acrylic polymer, titanium dioxide and additives, in particular a thickening agent, which are dispersed in an aqueous phase before application of the composition on the reinforcement layer, is non-Newtonian. Therefore, the viscosity of said composition does not remain constant during the application of the composition itself and the change of viscosity occurs when applying the coating on the reinforcement layer.

A surprising effect has now been noted when the solvent used in the composition was other than water. With the solvent other than water, the viscosity of the composition remains Newtonian, so it does not change during the application of the composition. Consequently, the acrylic polymer and the titanium dioxide anchor better to the reinforcement layer. So, the process using a solvent other than water during the dispersion step provides a waterproofing membrane which keeps its reflectivity property during a longer time in comparison with known membranes. Moreover, said process does not necessarily require the use of additives, in particular a thickening agent, to keep the viscosity of the composition constant during the application of said composition and allows to obtain a satisfactory application step.

In the second alternative, the process is characterized in that the acrylic polymer, the titanium dioxide and additives, in particular a thickening agent, are mixed with cristobalite and dispersed in aqueous phase before application of the composition.

Surprisingly, the presence of cristobalite in the composition provides a waterproofing membrane which keeps its reflectivity property for a longer time in comparison with known membranes. So, the yellowing of the membrane obtained by such a process is highly reduced. The particular choice of the cristobalite in the composition contributes substantially to obtain a more homogeneous dispersion of the additives, even when the solvent is water. Moreover, the mixture of cristobalite and titanium dioxide is synergistic. The presence of cristobalite in the composition increases the reflectivity properties of the titanium dioxide. The cristobalite contributes substantially to disperse more homogeneously the titanium dioxide when applying the composition on the reinforcement layer. Consequently, the amount of titanium dioxide can even be reduced as there is a better dispersion of it in the composition. Moreover, the sedimentation of titanium dioxide is also reduced by a better dispersion of it in the composition.

In a particular embodiment of the first alternative, the process for applying the composition according to the invention is characterized in that, when the solvent is other than water, the acrylic polymer and the titanium dioxide are mixed with cristobalite before application of the composition. Even when the solvent is not water, the use of cristobalite allows a further reduction of the yellowing for the waterproofing membrane obtained with the process according to the invention. The mixture of cristobalite and titanium dioxide in the composition is synergistic as mentioned above.

In another preferred embodiment according to the invention, the process for applying the composition is characterized in that the acrylic polymer and the titanium dioxide are mixed with talc, in a solvent other than water or in an aqueous phase, before application of the composition on the reinforcement layer. Talc is a suitable additive acting as a filler, which does not adversely affect the reflective properties of titanium dioxide.

In a particularly preferred embodiment according to the invention, the process for applying the composition is characterized in that the cristobalite has been obtained by heating quartz to substantially 1500° C. before it is mixed with acrylic polymer and titanium dioxide.

The thermal treatment of quartz to substantially 1500° C. allows to form extremely white cristobalite with a thermal conductivity of 8.5 W/mK, a thermal expansion of 20-300 C, a thermal capacity of 44.18 W/Mol C, a density of 2.32 g/cm$^3$ and an optical refraction index of 1.48.

The invention comprises, advantageously, the process for applying the composition according to the invention, characterized in that the acrylic polymer and the titanium dioxide are mixed with an additive composed by a core of titanium dioxide covered by calcium carbonate before application of the composition. The use of an additive composed by a core of titanium dioxide covered by calcium carbonate allows to use less titanium dioxide. The use of said additive is less expensive than pure titanium dioxide and does not hardly affect the reflectivity of the coated reinforcement layer.

Moreover, in a particular embodiment, the process for applying the composition according to the invention is characterized in that acrylic polymer and titanium dioxide are mixed with calcium carbonate before application of the composition. Calcium carbonate is a suitable additive which does not adversely affect the reflective properties of titanium dioxide.

The invention relates also to a composition for a waterproofing membrane characterized in that it comprises cristobalite.

Other characteristics and advantages of the invention will appear more clearly in the light of the following description together with the FIGUREs.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 represents a device for a one-step application;

FIG. 2 represents a device for a multi-step application;

DETAILED DESCRIPTION

Figure 3:
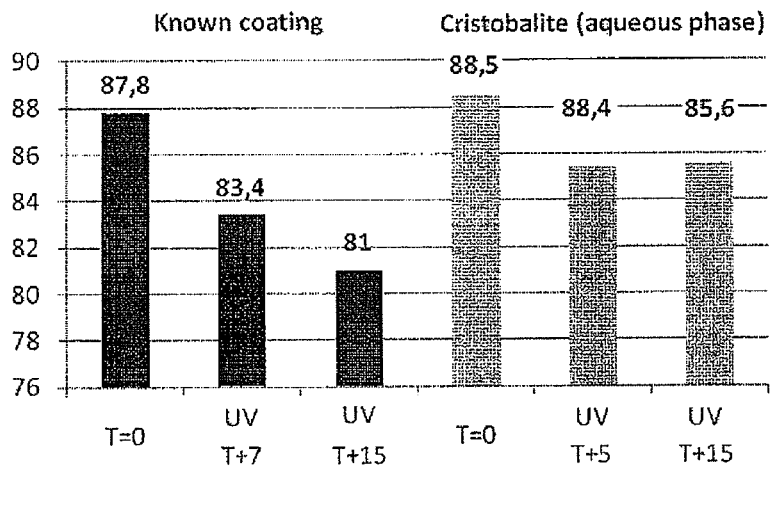
FIG. 3 illustrates the albedo in function of time of the compositions of a known coating and a coated reinforcement layer comprising cristobalite where the solvent is water.

A process for manufacturing a known waterproofing membrane comprises an application of a composition which comprises an acrylic polymer and titanium dioxide on one side of a reinforcement layer (glass and/or polyester fibre) and is detailed in US 2006/0110996. The method for applying a bituminous mass on another side of the reinforcement layer is given in WO 97/24485. For details about the acrylic polymer and the titanium dioxide, as well as for the manufacturing process, reference is made to both referred patent applications.

The acrylic based component is for example a polyacrylic latex or a copolymer latex, such as acrylic styrene (40 to 60% of the solids) and includes preferably relatively "short" aliphatic side chains of length less than 10 carbon atoms. In fact, the longer the side chains are, the lower of glass transition T$_g$ is, and the more flexible the product is. Nevertheless, if the glass transition T$_g$ is too low, exudation problems will appear. There must be searched for a compromise in between both the flexibility of the product and it's anti-exudation characteristics. It appeared that acrylic based components or acetate based polyvinyl components including aliphatic side chains "short" enough, with inferior length to 10 carbon atoms, match this compromise.

The process according to the prior art comprises a preparation of a composition which will be applied on the one side of the reinforcement layer. Such a composition comprises a mixture of an acrylic polymer and titanium dioxide, which is a viscous composition. The viscosity of said composition is either non-Newtonian or Newtonian and depends on the composition itself. In fact, when the solvent is water, additives are needed because the viscosity of said composition is non-Newtonian. It is not required to add additives in the composition where the solvent is other than water because the viscosity of said composition is Newtonian.

The viscosity of the composition comprising an acrylic polymer, titanium dioxide, additives, in particular a thickening agent, and talc, which are dispersed in an aqueous phase before application of the composition on a reinforcement layer, is non-Newtonian. The fact that the viscosity of the composition is non-Newtonian means that the viscosity changes while applying it on the reinforcement layer. When the solvent is water, it is required to add additives, in particular a thickening agent, otherwise the composition would not enough stabilize. It has also been noted that the use of said composition leads to the formation of a waterproofing membrane whose reflectivity decreases over time. A brief description of the process according to the prior art allows to highlight some factors and will make more clear why there is a link between the reflectivity decrease and the non-Newtonian viscosity.

Generally, a process for manufacturing a waterproofing membrane requires a preparation of a composition and an application of the composition on a reinforcement layer. When the solvent is water, the composition according to the prior art comprises the mixture of an acrylic polymer, titanium dioxide, additives and talc. The compounds of said composition are more susceptible to sediment during the mixing. Additives, in particular a dispersing agent, and high shear forces are needed to make a satisfactory dispersion and application on the reinforcement layer. Researches have however demonstrated that the dispersion of the known composition is still not sufficiently homogeneous and leads to reflectivity degradation of the coated reinforcement layer. Moreover, it has been observed that an additive like talc is present at the surface of the reinforcement layer (see FIG. 8), which indicated that the composition is not homogeneous within the coating. Therefore, the coated reinforcement layer looses its reflectivity properties in long-term as its composition changes due to the loss of some of the constituents.

In a composition according to the first alternative of the present invention, the composition comprises an acrylic polymer and titanium dioxide which are dispersed in a solvent other than water. In the second alternative, the composition is a mixture of an acrylic polymer, titanium dioxide, additives, in particular a dispersing agent, and cristobalite which are dispersed in water.

The method of application of a composition according to the invention is either a one-step application device or a multi-step application device.

The device provided for executing a one-step application is illustrated in FIG. 1 and comprises supply station for supplying a reinforcement layer (2) wound on a bobbin (1), a hopper (3) for supplying the composition, a rotatably driven carrier cylinder (4), a wiper blade (5), which is located just above the carrier cylinder and applies a pressure on it and on the coated reinforcement layer. A drying zone (7) is located after the cylinder. The reinforcement layer (2) is unrolled from the bobbin and moved towards the hopper (3), which supplies by gravity the composition to the layer (2). After supplying said composition, the reinforcement layer with the composition thereon reaches the carrier cylinder (4) and the wiper blade (5). The wiper blade will spread the composition on the reinforcement layer in order to adjust the thickness of the coating. Therefore, the layer with the applied composition is dried in the drying zone (7) in order to obtain the final coated reinforcement layer (6).

The device for the multi-step application is illustrated in FIG. 2 and distinguishes over the device provided for executing the one-step application in that it also comprises a second hopper (8), a second carrier cylinder (9), a second wiper blade (10) and a second drying zone (11), situated after the first drying zone (7). In this embodiment, the wiper blades are however no longer above the cylinders but offset and downstream from the cylinders. After drying in the drying zone (7) of the applied composition, the reinforcement layer is moved towards the second hopper (8) and the second carrier cylinder (9) in order to form an additional layer on the reinforcement layer. Then, the reinforcement layer is moved towards the second wiper blade to adjust the thickness of the layer. After drying (11) of the applied composition, the reinforcement layer is moved in the same way as described in the beginning of the description of the multi-step application. If more than two layers of composition are required, additional hoppers, cylinders, wiper blades and drying zone can be applied.

The one-step application or the multi-step application is used when the dispersion is realised either in a solvent other than water or in water. However, the multi-step application is preferably used when the dispersion is realised in a solvent other than water. When the solvent is other than water, the viscosity is Newtonian so it is not required to have the wiper blade directly located above the carrier cylinder, contrarily in an aqueous phase, because the viscosity is constant in that situation, and less shear forces is required for applying the composition.

FIG. 3 illustrates the albedo in function of time of a known coated reinforcement layer (comprising talc) and a coated reinforcement layer where an acrylic polymer, titanium dioxide, additives, in particular a thickening agent, and cristobalite are dispersed in an aqueous phase before application of the composition on the reinforcement layer. The albedo corresponds to the reflectivity of the coated reinforcement layer in the visible range of the solar spectrum. The reflectivity has been measured at different times (after 0 days (T=0), after 7 days (T+7) under ultra-violet rays and after 15 days (T+15) under ultra-violet rays).

The analysis of the results shows that the reflectivity of the coated reinforcement layer comprising cristobalite is higher in comparison with the known coated reinforcement layer after 0 days (T=0). This is due to the synergistic effect between the cristobalite and the titanium dioxide. Indeed, cristobalite allows a better dispersion of the titanium dioxide in the composition. Therefore, the reflectivity of the coated reinforcement layer is increased as the titanium dioxide is more uniformly spread.

Figure 4:
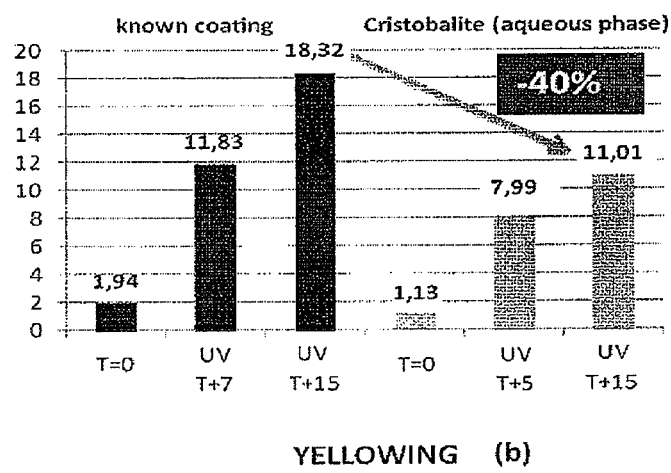
FIG. 4 illustrates the yellowing in function of time of the compositions of a known coating and a coated reinforcement layer comprising cristobalite where the solvent is water.
Figure 12:
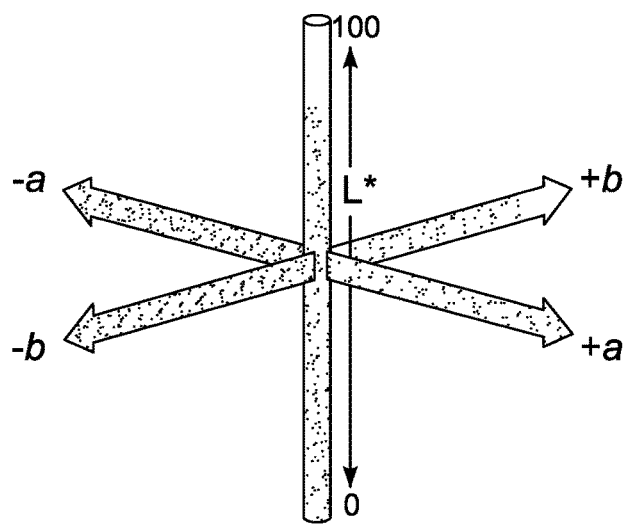
FIG. 12 represents the measurement method of a tint in a three dimensional model.
Figure 13:
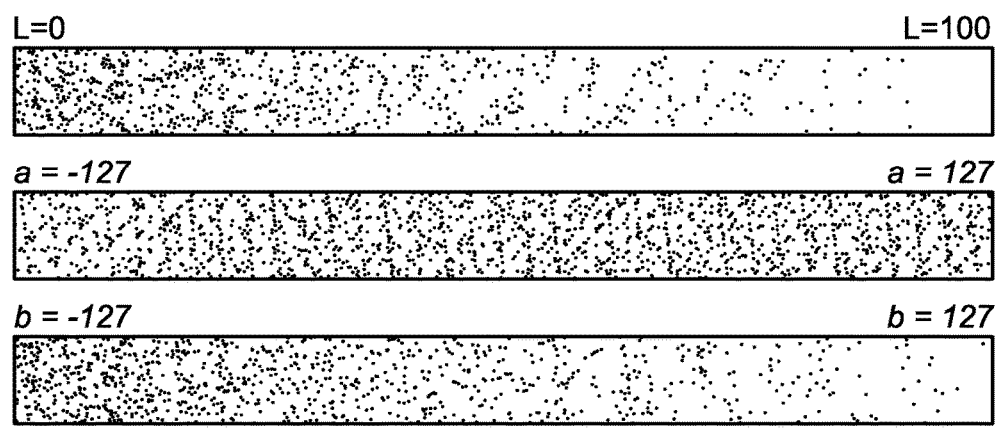
FIG. 13 illustrates three scales of values for the parameters "L", "a" and "b".

FIG. 4 illustrates the yellowing in function of time of the coated reinforcement layers as mentioned above (FIG. 3). The unit of the yellowing is expressed through the value of a "b" parameter defined by the method of measurement of a tint (CIELAB). The CIELAB method is a three-dimensional model of representation of colours and allows to characterize a tint according to three axis (FIG. 12). The vertical axis (L) represents the brightness which varies from 0 to 100 corresponding to the black colour and to the white colour respectively. The horizontal axis (a) comprises a positive and a negative maximum values of the "a" parameter corresponding to the red colour (+127) and to the green colour (−127) respectively. The other horizontal axis (b) has a value of "b" which can be also positive or negative. The most negative value of the "b" parameter represents the blue colour (−127) and the most positive value of the "b" parameter (+127) corresponds to the yellow colour. FIG. 13 represents three scales of values for each parameter of the measurement method of a tint (0≤L≤100, −127≤"a"≤+127 and −127≤"b"≤+127).

In the known coated reinforcement layer of FIG. 4, the yellowing increases over time. It is noted that the yellowing is reduced in the composition comprising cristobalite. So, the presence of cristobalite in the composition has two effects. Firstly, it allows the increase of the reflectivity properties of the titanium dioxide by a better dispersion in the composition. Secondly, it provides a coated reinforcement layer whose reflectivity remains more stable over the years.

Figure 5:
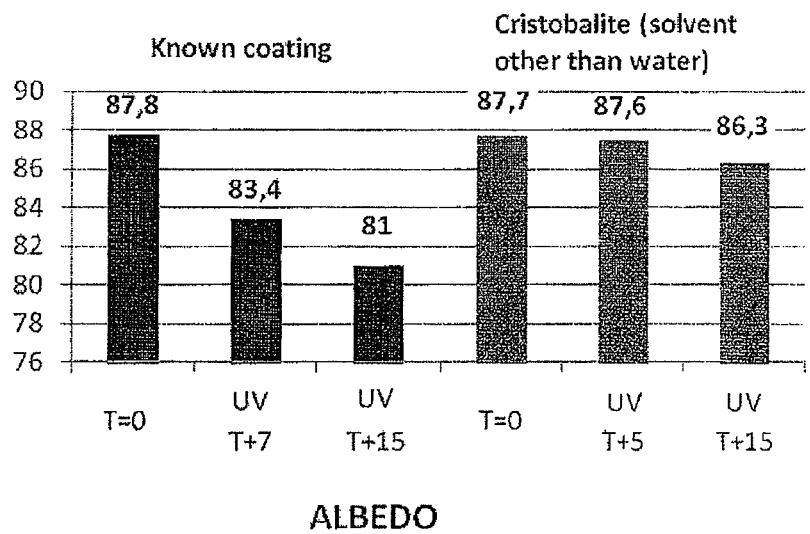
FIG. 5 illustrates the albedo in function of time of the compositions of a known coating and a coated reinforcement layer comprising cristobalite where the solvent is other than water.

FIG. 5 illustrates the albedo in function of time of a known coated reinforcement layer (comprising talc) and a coated reinforcement layer where an acrylic polymer, titanium dioxide and cristobalite are dispersed in a solvent other than water before application of the composition on the reinforcement layer.

It is noted that the reflectivity of the coated reinforcement layer comprising cristobalite remains stable over time in comparison with the known coating. This is also due to the synergistic effect between cristobalite and titanium dioxide.

Figure 6:
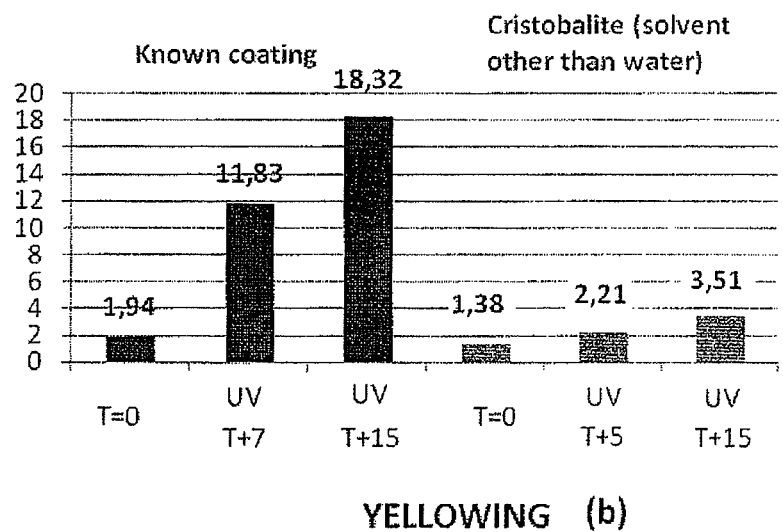
FIG. 6 illustrates the yellowing in function of time of the compositions of a known coating and a coated reinforcement layer comprising cristobalite where the solvent is other than water.

FIG. 6 illustrates the yellowing of the coated reinforcement layers as described above (FIG. 5) over time. It is noted that the yellowing is highly reduced in the coating comprising cristobalite where the solvent used is other than water.

The use of cristobalite in the composition thus allows to obtain a more homogeneous dispersion and a stability of the reflectivity of the coated reinforcement layer.

The solvent and the compounds in the composition are the elements which are determinant in obtaining a stable dispersion, leading to a waterproofing membrane whose reflectivity decrease over time is reduced.

In the first alternative of the present invention, the use of a solvent other than water, allows to keep a Newtonian viscosity in the composition. The fact that the viscosity remains Newtonian and thus stable allows that the shear forces described above do not constitute a limiting factor in the obtaining of a homogeneous dispersion.

In the second alternative of the present invention where the solvent is water, it has been noted that the addition of cristobalite in the composition comprising acrylic polymer, titanium dioxide and additives, in particular a thickening agent, leads to the formation of a homogeneous dispersion. Additives, in particular a thickening agent, have to be used in this embodiment because the process is realised in an aqueous phase which enables spreading and avoiding passing through the structure of the reinforcement layer while applying it. This surprising embodiment, where cristobalite is present in the composition, allows the manufacturing of a waterproofing membrane where its reflectivity decrease is reduced, even if the solvent is water.

The following tables illustrate some examples of compositions in order to manufacture a waterproofing membrane where its reflectivity remains longer over time in comparison with a known membrane.

The examples 1 to 4 illustrates compositions where the solvent is other than water and the example 5 illustrates a composition where the solvent is water (aqueous phase).

Table 1 illustrates a first example of composition according to the invention. The composition comprises an acrylic polymer and titanium dioxide which are dispersed in a solvent other than water before application of the composition on the reinforcement layer.

In each of the following tables, the first column of each table comprises the compounds of the composition. The second column gives an example of the composition according to the invention and the third column comprises ranges in weight percentage for each compound in the composition according to the invention.

The solvent used in the following examples is for example dimethylformamide, methyl ethyl ketone or toluene.

Table 1 illustrates the composition of the coated reinforcement layer without cristobalite in a solvent other than water.

TABLE 1

| Compounds of the composition | % in wet weight | Range (% in wet weight) |
| --- | --- | --- |
| Acrylic polymer dispersed in solvent (40% solid) | 33 | 20-75 |
| $TiO_2$ | 5 | 0-20 |
| Calcium carbonate | 35 | 20-50 |
| core of titanium dioxide covered by calcium carbonate | 14 | 0-20 |
| Solvent | 9 | 0-20 |
| Biocide | 2 | 0.5-4 |
| Optical brightener | 2 | 0-5 |

It is also possible to have the composition according to table 1 without the presence of the core of titanium dioxide covered by calcium carbonate. In that case, the composition will comprise more titanium dioxide and calcium carbonate in the preferred embodiment.

Table 2 illustrates a second example of a composition according to the invention where cristobalite is mixed with acrylic polymer and titanium dioxide before application of the composition on the reinforcement layer. The dispersion step is realised in a solvent other than water.

TABLE 2

| Compounds of the composition | % in wet weight | Range (% in wet weight) |
| --- | --- | --- |
| Acrylic dispersed in solvent (40% solid) | 33 | 20-75 |
| $TiO_2$ | 5 | 0-20 |
| Calcium carbonate | 35 | 20-50 |
| Cristobalite | 14 | 0-20 |
| Solvent | 9 | 0-20 |
| Biocide | 2 | 0.5-4 |
| Optical brightener | 2 | 0-5 |

Cristobalite is white and has reflective property with an optical refraction index of 1.48. Cristobalite is obtained by heating quartz to substantially 1500° C. and is preferably catalyzed by the addition of a sodium based flux additive. Cristobalite has a thermal conductivity of 8.5 W/mK, a thermal expansion of 20-300 C, a thermal capacity of 44.18 W/Mol C and a density of 2.32 g/cm$^3$.

The mixture of cristobalite and titanium dioxide is synergistic and allows to use a reduced amount of titanium dioxide in the composition because cristobalite contributes to disperse more effectively the titanium dioxide in the obtained composition. Moreover, it has been noted that this embodiment allows to increase the reflectivity of the coated reinforcement layer, by the synergistic effect mentioned above. At the same time, it allows to reduce considerably the yellowing of said coated reinforcement layer in comparison with known coatings.

The percentage in wet weight of cristobalite in the composition is between 0-20%, 5-15% or in a preferential embodiment 14%.

Table 3 illustrates a third example of a composition according to the present invention where talc is mixed with acrylic polymer and titanium dioxide before application of the composition on the reinforcement layer. The dispersion step is realised in a solvent other than water.

TABLE 3

| Compounds of the composition | % in wet weight | Range (% in wet weight) |
|---|---|---|
| Acrylic dispersed in solvent (40% solid) | 33 | 20-75 |
| $TiO_2$ | 5 | 0-20 |
| Calcium carbonate | 35 | 20-50 |
| Talc | 14 | 0-20 |
| Solvent | 9 | 0-20 |
| Biocide | 2 | 0.5-4 |
| Optical brightener | 2 | 0-5 |

The percentage in wet weight of talc in the composition is between 0-20%, 5-15% or in a preferential embodiment 14%.

Table 4 illustrates a fourth example of a composition according to the invention where acrylic polymer and titanium dioxide are mixed with talc and cristobalite and dispersed in a solvent other than water before application of the composition on the reinforcement layer.

TABLE 4

| Compounds of the composition | % in wet weight | Range (% in wet weight) |
|---|---|---|
| Acrylic dispersed in solvent (40% solid) | 33 | 20-75 |
| $TiO_2$ | 5 | 0-20 |
| Calcium carbonate | 35 | 20-50 |
| Talc and cristobalite | 14 | 0-20 |
| Solvent | 9 | 0-20 |
| Biocide | 2 | 0.5-4 |
| Optical brightener | 2 | 0-5 |

The percentage in wet weight of cristobalite and talc in the composition is between 0-20%, 5-15% or in a preferential embodiment 14%.

Table 5 is a fifth example of a composition of a coating according to the invention where acrylic polymer and titanium dioxide are mixed with cristobalite and dispersed in an aqueous phase before application of the composition on the reinforcement layer.

TABLE 5

| Compounds of the compsoition | % in wet weight | Range (% in wet weight) |
|---|---|---|
| Acrylic (emulsion in water 50% solid) | 30 | 20-75 |
| H2O | 8.80 | 2-20 |
| Dispersing agent | 0.50 | 0.3-0.8 |
| Anti-foaming agent | 0.50 | 0.3.0.8 |
| Biocide | 1 | 0.5-4 |
| $TiO_2$ | 5.00 | 0-20 |
| $TiO_2$ covered by CaCO3 | 5.00 | 0-20 |
| Cristobalite | 7.00 | 0-20 |
| Calcium carbonate | 42.00 | 0-50 |
| Thickener | 0.20 | 0.1-0.5 |

The composition of table 5 where the dispersion step is realised in an aqueous phase requires the use of additives like a dispersing agent, an anti-foaming agent and a thickener. These additives are not necessarily needed when the dispersion step is realised in a solvent other than water. In a solvent other than water, the composition is less sensitive to sedimentation of the additives. When the solvent is water, it is preferred to use a dispersing agent, an anti-foaming agent and a thickener to avoid that the shear forces becomes a limiting factor during the dispersion step. Moreover, the addition of cristobalite in the composition allows to form a waterproofing membrane where its reflectivity decrease is reduced because cristobalite is homogeneously dispersed in the composition.

The percentage in wet weight of cristobalite in the composition is between 0-20%, 5-15% or in a preferential embodiment 14%.

It is also possible to add talc in the composition described in table 5.

Some infrared analyses were realised in order to show the difference between a known coated reinforcement layer and a coated reinforcement layer obtained by the present invention.

Figure 7:
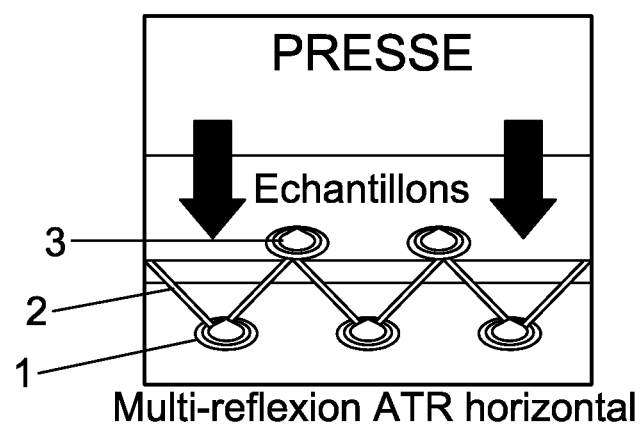
FIG. 7 illustrates an infrared analysis of the composition.

The test method of an infrared analysis (FIG. 7) consists in pressing a coated reinforcement layer (a sample) on a crystal like zinc selenide (ZnSe) with a refraction index of around 2.4. The infrared beam (1) for example produced by a laser (not shown) penetrates into and travels through the crystal (2) and it is reflected on the crystal-sample interface and inside the crystal (FIG. 7). At each reflection on the crystal-sample interface, beam penetrates a short distance (evanescent wave) in the sample (3) which causes absorptions by the coating present on the sample. In another words, this internal reflectance, located on the crystal-sample interface, creates an evanescent wave that extends beyond the surface of the crystal into the sample held in contact with the crystal. So, for each reflection the sample absorbs the evanescent wave which has been created. In regions of the infrared spectrum where the sample absorbs energy, the evanescent wave will be attenuated or altered. The alternated energy from each evanescent wave is passed back to the infrared beam, which then exits the opposite end of the crystal and is passed to a detector in an infrared spectrometer. The results are obtained through infrared spectrum. So, in the framework of the present invention, the infrared method is used to analyse a coated reinforcement layer.

The infrared analysis was carried out with a Horizontal Attenuated Total Reflexion (HATR), with a resolution of 4 $cm^{-1}$, 128 scans per spectra and 3 spectra per sample (FT-IR Spectroscopy, Attenuated Total Reflectance (ATR), 2005, technical note available on the following website: http://shop.perkinelmer.com/content/technicalinfo/tch_ftiratr.pdf)

Infrared analyses were realised for a known coated reinforcement layer comprising talc in order to analyse its surface.

Firstly, a coated reinforcement layer is placed on a crystal of zinc selenide (ZnSe) and pressed on the latter. Secondly, after removing of the coated reinforcement layer from the crystal, the infrared analysis is realised for the crystal without the presence of the coated reinforcement layer. The infrared analysis revealed traces of talc on the crystal. Consequently, it means that the coated reinforcement layer comprised talc at its surface. The loss of talc on the reinforcement layer leads to the reduction of the reflectivity of said coated reinforcement layer in long-term.

Figure 8:
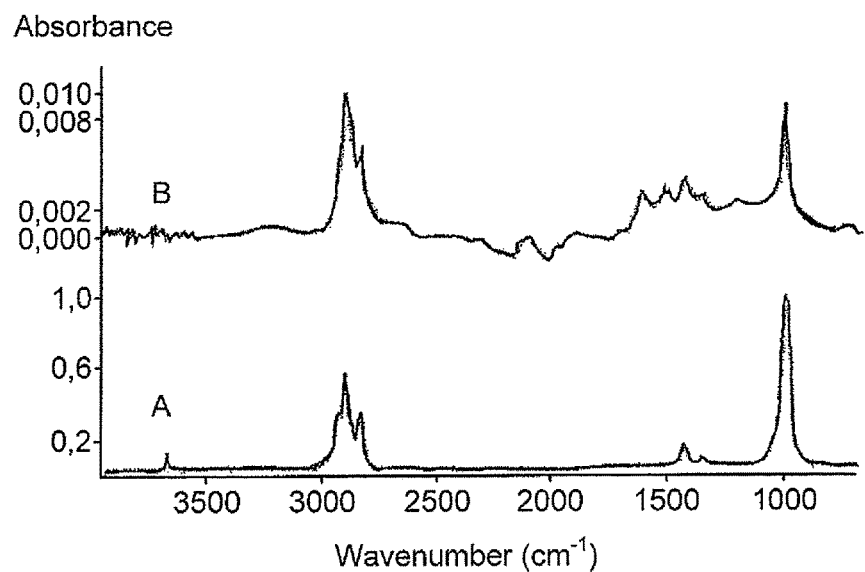
FIG. 8 represents a graph showing the absorbance in function of wavenumber (cm$^{-1}$) of talc and the absorbance after removing of the coated reinforcement layer from the crystal. The graph comprises two spectra. Spectrum A corresponds to talc and spectrum B corresponds to the spectrum after removing of the coated reinforcement layer from the crystal.

FIG. 8 illustrates two spectra (absorbance in function of wavenumber ($cm^{-1}$)) in the case of a known membrane as mentioned above.

Infrared spectrum B corresponds to the characteristics absorption peaks of talc and the infrared spectrum A is the result after removing of the coated reinforcement layer from the crystal. The comparison of both spectra allows to note that traces of talc are present on the crystal because spectrum B comprises some of the characteristics absorption peaks of talc (spectrum A). Therefore, the presence of these characteristics absorption peaks allows to conclude that talc was present on the surface of the crystal which could only come from the coating on the reinforcement layer. This is because, in a known coated reinforcement layer, talc was not impregnated sufficiently in the layer as described here before. Consequently, talc is present on the surface of the coated reinforcement layer because it does not adhere sufficiently in the obtained composition. The presence of talc on the surface of the known coated reinforcement layer is responsible of the reflectivity decrease of the waterproofing membrane.

Infrared analyses (FIG. 9) were realised for the composition described in table 3 in order to analyse the coated reinforcement layer obtained by the process using a solvent other than water.

Figure 9:
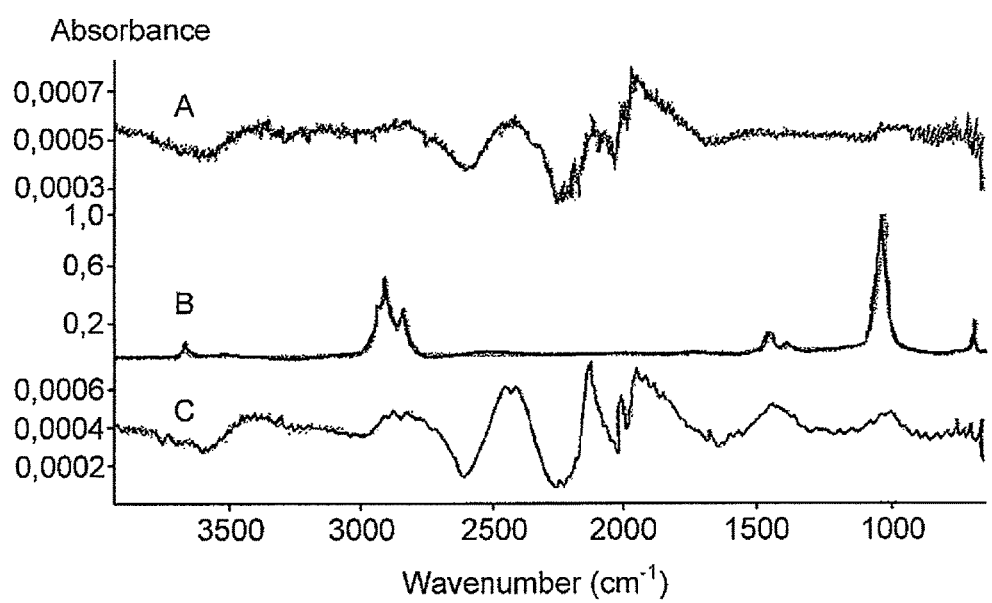
FIG. 9 represents a graph showing the absorbance in function of wavenumber (cm$^{-1}$) of the crystal, the coated reinforcement layer and after removing of the coated reinforcement layer from the crystal. The graph comprises three spectra. Spectrum A corresponds to the spectrum of the crystal, spectrum B corresponds to the spectrum of the coated reinforcement layer and spectrum C is the result after removing of the coated reinforcement layer from the crystal.

FIG. 9 illustrates three spectra. Infrared spectrum A corresponds to the spectrum of the crystal. Infrared spectrum B corresponds to the spectrum of the coated reinforcement layer. Infrared spectrum C corresponds to the result after removing of the coated reinforcement layer from the crystal.

On the basis of the comparison of spectrum C with A and B, it is noted that nearly no traces of talc are present on the surface of the coated reinforcement layer. Indeed, the characteristics absorption peaks of talc are nearly not present in spectrum C, but the latter looks more like spectrum A which corresponds to the crystal alone so without the presence of the coated reinforcement layer.

To conclude, these results tend to show that talc becomes impregnated sufficiently in the composition when the solvent is other than water in comparison to a known coated reinforcement layer when the dispersion step is realised in an aqueous phase.

Figure 10:
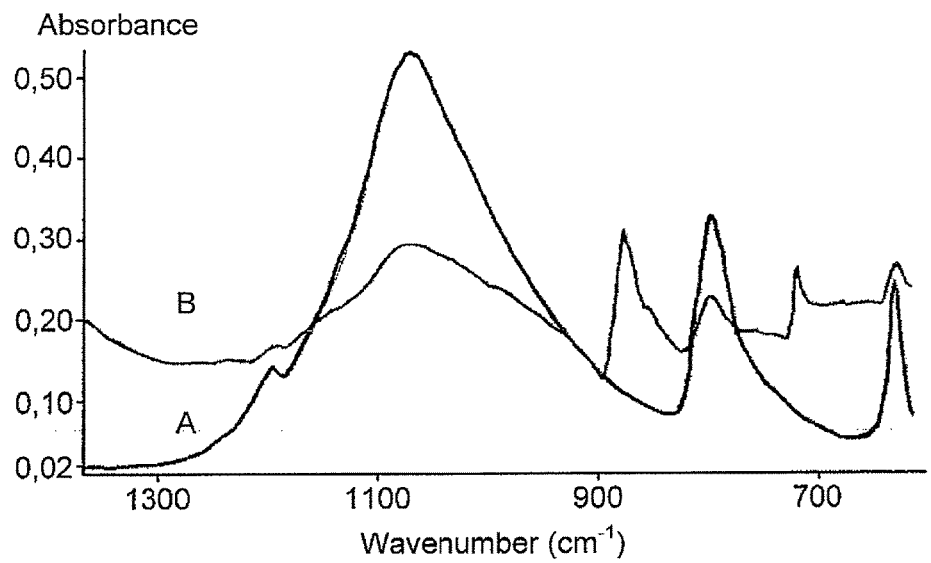
FIG. 10 represents a graph showing the absorbance in function of wavenumber (cm$^{-1}$) of pure cristobalite and the coated reinforcement layer comprising cristobalite where the solvent was other than water. The graph comprises two spectra. Spectrum A is the spectrum of pure cristobalite and spectrum B is the spectrum of the coated reinforcement layer comprising cristobalite.

Infrared analyses (FIG. 10) were realised for the coated reinforcement layer where cristobalite is dispersed in a solvent other than water with the composition of table 2. Spectrum A of FIG. 10 represents the spectrum of pure cristobalite and spectrum B corresponds to the coated reinforcement layer comprising cristobalite. These results show that all the characteristics absorption peaks (spectrum A) of cristobalite are not present in spectrum B. That means that cristobalite remains in the coated reinforcement layer and not on the surface of the latter. However, it is noted from the comparison between spectrum A and B that some of the characteristics absorption peaks of cristobalite are present in spectrum B but these absorption peaks are weak in comparison to those in spectrum A. This is due to the manner to realise the measurement. In fact, during the infrared measurement, the coated reinforcement layer was present on the crystal so it is possible that the infrared rays penetrates into the coating in such a way that cristobalite contained in it absorbed an amount of the infrared rays. This is why all the characteristics absorption peaks of cristobalite are not present in spectrum B and in the same intensity as spectrum A. These analyses allow to conclude that cristobalite is not present on the coated reinforcement layer.

Infrared analyses were realised (FIG. 11) in order to analyse a coated reinforcement layer obtained with the composition of table 5 where the dispersion is realised in an aqueous phase.

Figure 11:
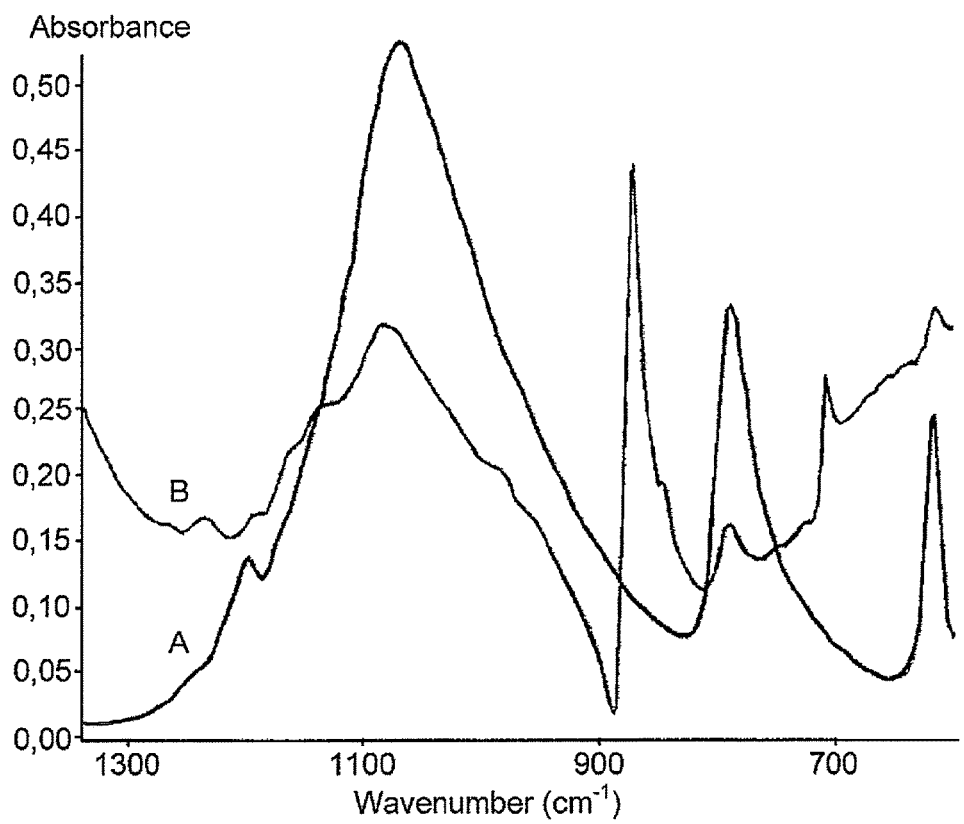
FIG. 11 represents a graph showing the absorbance in function of wavenumber (cm$^{-1}$) of pure cristobalite and the coated reinforcement layer comprising cristobalite where the solvent was water. The graph comprises two spectra. Spectrum A is the spectrum of pure cristobalite and spectrum B is the spectrum of the coated reinforcement layer comprising cristobalite.

Spectrum A of FIG. 11 represents the spectrum of pure cristobalite and spectrum B corresponds to the coated reinforcement layer comprising cristobalite. These results show that all the characteristics absorption peaks (spectrum A) of cristobalite are not present in spectrum B. That means that cristobalite remains in the coated reinforcement layer and not on the surface of the latter. However, it is noted from the comparison between spectrum A and B that some of the characteristics absorption peaks of cristobalite are present as it was the case in the analysis of the results illustrated in FIG. 10. So, the fact that the coated reinforcement layer was present on the crystal during the measurement involves the absorption of the infrared rays by the cristobalite which is present in the coated reinforcement layer. Consequently, the absorption peaks of low intensity noted in the spectrum b are due to the absorption of a small amount of infrared rays by cristobalite. These analyses allow to conclude that cristobalite is not present on the coated reinforcement layer.

While illustrative embodiments have been illustrated and described, it will be appreciated that various changes can be made therein without departing from the spirit and scope of the invention.

The embodiments of the invention in which an exclusive property or privilege is claimed are defined as follows:

1. A process for manufacturing a waterproof membrane comprising:
   preparing a composition comprising an acrylic polymer having aliphatic side chains of fewer than 10 carbon atoms and titanium dioxide dispersed in a solvent other than water;
   coating a reinforcement layer by application of said composition having a Newtonian viscosity on one side of the reinforcement layer;
   evaporating said solvent out of said composition having a Newtonian viscosity;
   drying the reinforcement layer to provide a coated reinforcement layer; and
   applying a bituminous mass on another side of said coated reinforcement layer.

2. The process according to claim 1, characterized in that the composition further comprises cristobalite.

3. The process according to claim 1, characterized in that the composition further comprises talc.

4. The process according to claim 2, characterized in that, prior to preparing the composition, the cristobalite is obtained by heating quartz to substantially 1500° C.

5. The process according to claim 1, characterized in that the composition further comprises an additive composed by a core of titanium dioxide covered by calcium carbonate.

6. The process according to claim 1, characterized in that the composition further comprises calcium carbonate.

7. The process according to claim 1, characterized in that the solvent other than water is chosen from the group consisting of dimethylformamide, methyl ethyl ketone, and toluene.

* * * * *